W. BRAND & G. PUDER.
Rotary Churns.
No. 140,112. Patented June 24, 1873.
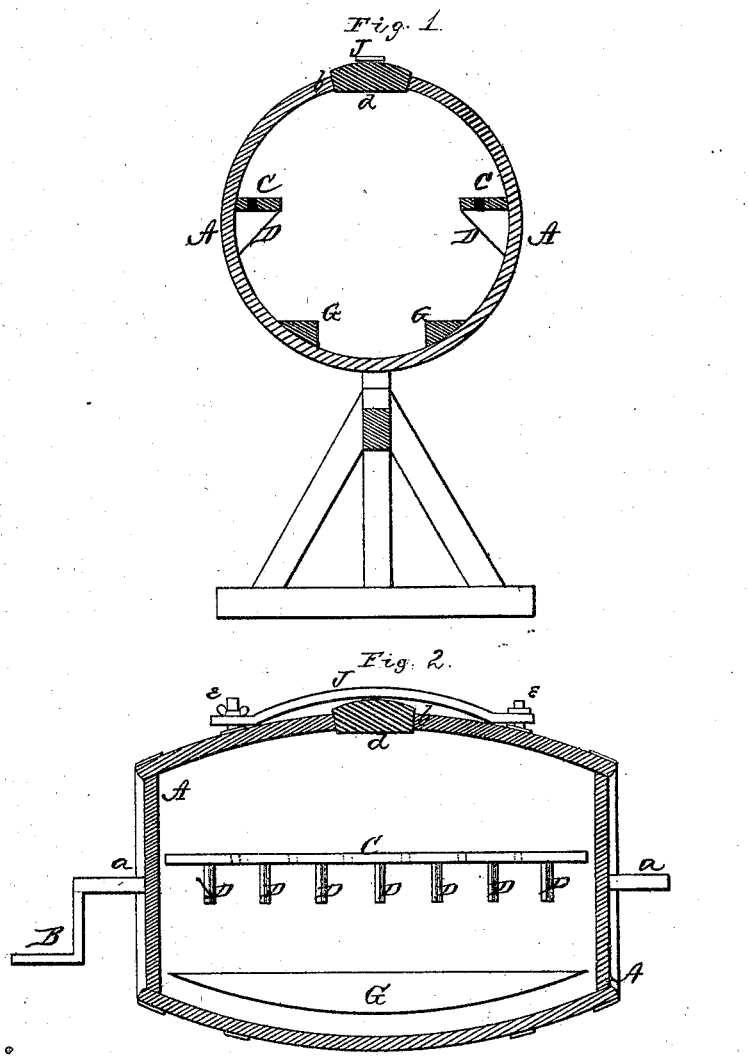

UNITED STATES PATENT OFFICE.

WILLIAM BRAND AND GOTTLIEB PUDER, OF EVANSVILLE, INDIANA.

IMPROVEMENT IN ROTARY CHURNS.

Specification forming part of Letters Patent No. 140,112, dated June 24, 1873; application filed April 10, 1873.

*To all whom it may concern:*

Be it known that we, WILLIAM BRAND and GOTTLIEB PUDER, of the city of Evansville, in the county of Vanderburg and State of Indiana, have invented certain new and useful Improvements in Churns; and we do hereby declare that the following is a full, clear, and exact description thereof, reference being had to the accompanying drawings and to the letters of reference marked thereon which form a part of this specification.

The nature of our invention consists in an improvement in the construction and arrangement of rotary churns; which will be hereinafter more fully set forth and claimed.

In order to enable others skilled in the art to which our invention appertains to make and use the same, we will now proceed to describe the construction of the churn and the operation of the same, as well as the method of washing the butter in the churn, referring to the annexed drawing, in which—

Figure 1 is a transverse vertical section, and Fig. 2 a longitudinal vertical section of our churn.

A represents a barrel of any suitable dimensions, both heads of which are provided with pivots, a, to support the barrel in a horizontal position on a suitable frame; and one of these pivots is provided with a crank, B, for revolving the churn, or a shaft may pass longitudinally through the churn in place of the two pivots. Within the barrel A are two blades or wings, C C, attached to the staves parallel to the axis, perforated at intervals, and at these intervals provided with triangular blades D D, on their under sides, and standing at right-angles with them. These wings are situated equidistant from the opening b of the barrel, the distance between them across said opening being one-third of the circumference, more or less, and the triangular blades C C facing each other. There are also attached, lengthwise of the barrel, parallel with the wings C C, two or more triangular slips G G, beneath the two perforated wings, opposite to the opening. The opening b is provided with a plug d, made tapering, so that a piece of muslin spread over the opening and pressed in with the plug or lid will render it tight. This plug or lid is then held by a latch, J, fastened by bolts and nuts e e, as shown. The cream is put through the opening into the barrel, and then closed by the lid, which may be provided with a vent for the escape of the gases. The barrel is then revolved by means of the crank B. When the butter has been in this manner completely separated, the buttermilk is drawn off through the opening. The butter is made, by simple manipulation, to lodge between the wings. The barrel is then partly filled with cold water, and kept in an oscillating motion, so that the butter is kept between the wings C C, and by means of the triangular blades D D most thoroughly washed, and at the same time united or kneaded together.

Having thus fully described our invention, what we claim as new, and desire to secure by Letters Patent, is—

The barrel-churn A, provided with perforated wings C C, inclined beveled edged blades D D below, and triangular strips G G between said wings, all substantially as and for the purpose herein specified.

In testimony that we claim the foregoing as our own, we affix our signatures in presence of two witnesses.

WILLIAM BRAND,
GOTTLIEB PUDER.

Witnesses:
 ALEX. TILLMAN,
 SIEGMUND SEELY.